(12) United States Patent
Broberg

(10) Patent No.: US 6,401,381 B1
(45) Date of Patent: Jun. 11, 2002

(54) FISHING ROD HOLDER

(75) Inventor: James E. Broberg, Crystal Lake, IL (US)

(73) Assignee: Du-Bro Products, INC, Wauconda, IL (US)

( * ) Notice: Subject to any disclaimer, the term of this patent is extended or adjusted under 35 U.S.C. 154(b) by 0 days.

(21) Appl. No.: 09/660,697

(22) Filed: Sep. 13, 2000

(51) Int. Cl.$^7$ ............................................... A01K 97/10
(52) U.S. Cl. .......................... 43/21.2; 248/512; 248/910
(58) Field of Search ................................ 43/21.2, 54.1; 248/512, 519, 910; 211/70.8

(56) References Cited

U.S. PATENT DOCUMENTS

| | | | | |
|---|---|---|---|---|
| 2,354,118 A | * | 7/1944 | Hansen | 248/512 |
| 2,448,752 A | * | 9/1948 | Wagner | 248/512 |
| 3,571,964 A | * | 3/1971 | Bogathy | 43/21.2 |
| 3,603,019 A | * | 9/1971 | Smeltzer | 43/21.2 |
| 4,311,262 A | * | 1/1982 | Morin | 43/21.2 |
| 4,696,122 A | * | 9/1987 | Van Der Zyl | 43/21.2 |
| 4,953,318 A | * | 9/1990 | Vasseur, Jr. | 43/21.2 |
| 5,571,227 A | * | 11/1996 | Pisarek | 43/21.2 |
| 5,651,526 A | * | 7/1997 | Spinner | 248/519 |
| 5,657,883 A | * | 8/1997 | Badia | 211/70.8 |
| 5,692,335 A | * | 12/1997 | Magnuson | 43/54.1 |
| 5,806,827 A | * | 9/1998 | Gilmore | 248/534 |
| 5,836,103 A | * | 11/1998 | Taylor | 43/54.1 |
| 5,855,087 A | * | 1/1999 | Risinger | 43/21.2 |
| 5,913,673 A | * | 6/1999 | Womac | 43/54.1 |
| 6,047,491 A | * | 4/2000 | De Busk | 43/21.2 |
| 6,250,480 B1 | * | 6/2001 | McGuinness | 211/70.8 |

* cited by examiner

Primary Examiner—Darren W. Ark
(74) Attorney, Agent, or Firm—Niro, Scavone, Haller & Niro

(57) ABSTRACT

A fishing rod holder which positively retains and secures a plurality of poles for storage and cleaning includes a base defining an internal cavity in communication with a fill hole for adding weight to the device. The base also includes apertures which extend through the base and legs for holding the base above a support surface. Opposingly located side panels are connected to the base by hinges and include channels which are positioned to align with the apertures in the base to form rod retention holes.

3 Claims, 4 Drawing Sheets

FISHING ROD HOLDER

BACKGROUND OF THE INVENTION

The present invention relates to a novel device and method for storing and securing fishing rods prior to and during cleaning. More specifically, the present invention provides a base with a plurality of apertures which hold a fishing rod in place during storage and cleaning.

SUMMARY OF THE INVENTION

Fishing rods by design are difficult to store and clean due to their design. Their length and weight distribution prevent a free standing operation and when rested against an object or surface such as a wall, they are easily knocked over. These problems in securing and handling make it difficult to wash and clean fishing rods after use in order to maintain the life of the equipment. Often the poles are placed against a wall or in a rack and washed with the high probability that the force of the water used in washing will knock over one or more poles.

The present invention provides a device which positively retains and secures a plurality of poles for storage and cleaning. The present invention includes a base defining an internal cavity in communication with a fill hole for adding weight to the device. The base also includes a plurality of rod retention holes for releasably securing fishing rods and legs for holding the base above the support surface.

DESCRIPTION OF THE DRAWINGS

These and other features, objects and advantages of the present invention will become apparent from the following description and drawings wherein like reference numerals represent like elements in several views, and in which.

DESCRIPTION OF THE PREFERRED EMBODIMENT

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
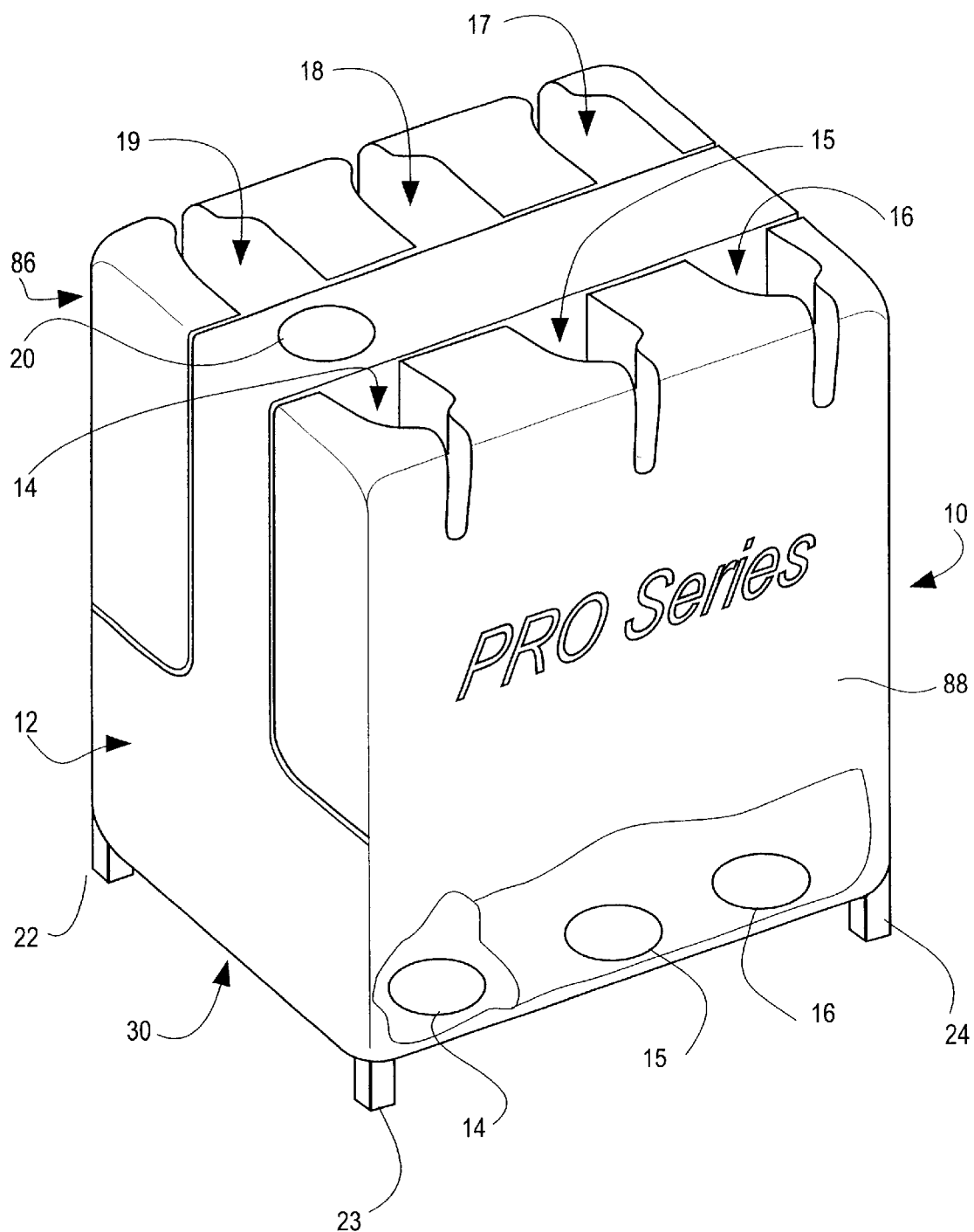
FIG. 1 is a perspective view with portions removed to reveal various aspects of the invention.

As shown in FIG. 1, the present invention includes a base 10 defining an internal cavity 12 and a plurality of apertures 14–19 which extend completely through base 10. A fill hole 20 is also provided which is in communication with cavity 12.

Positioned at each corner of base 12 are legs which raise bottom 30 of base 12 off of a support surface. Three of the legs are shown as numbers 22–24 with the fourth leg not shown.

Figure 3:
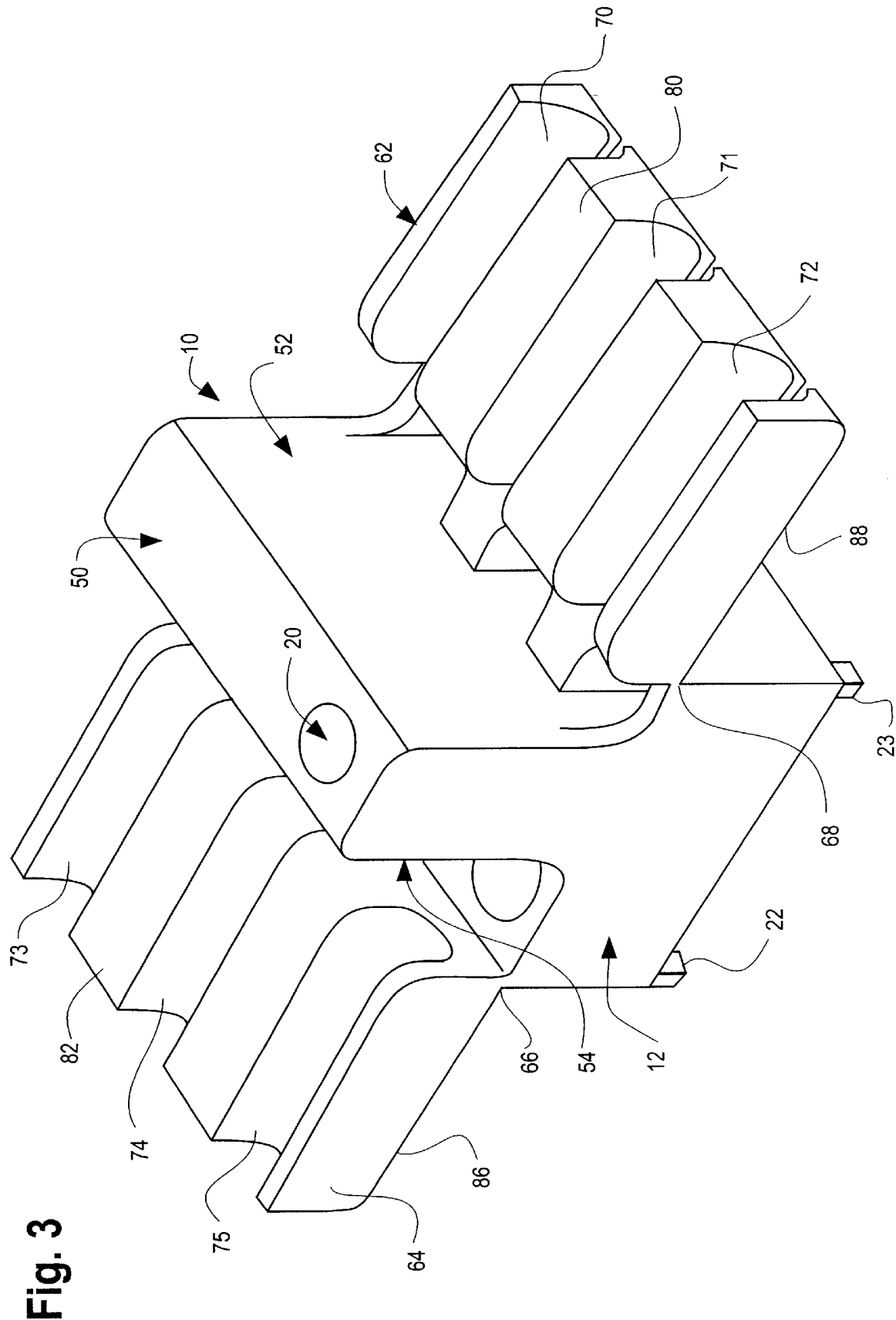
FIG. 3 is another perspective view of the present invention.
Figure 4:
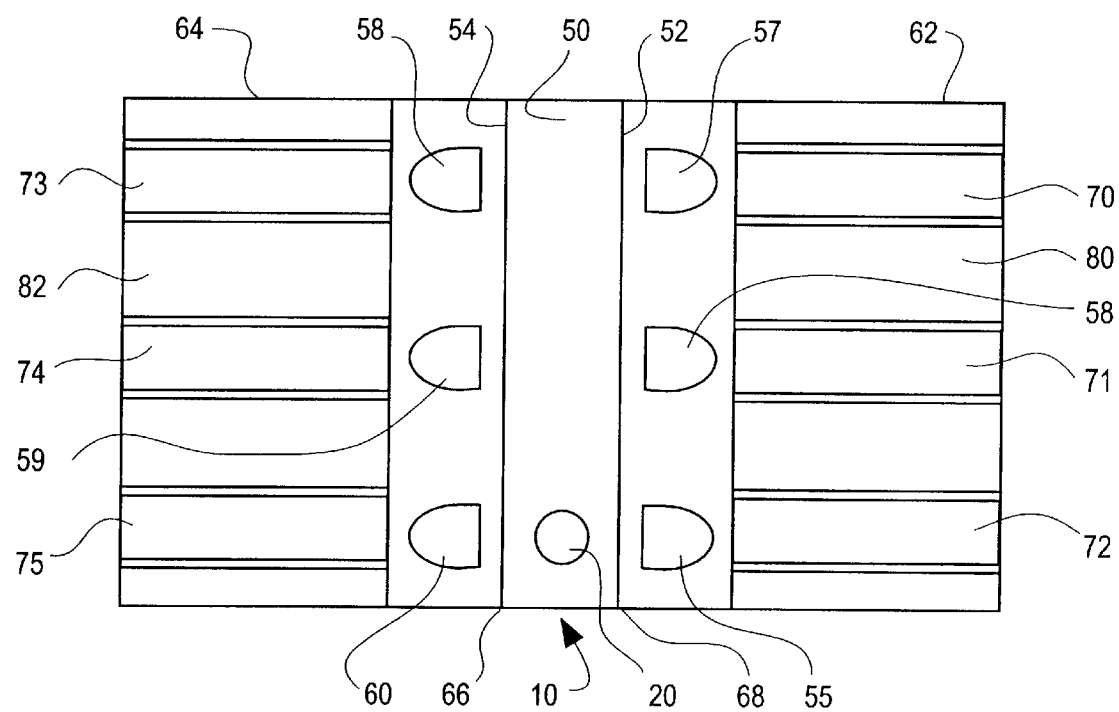
FIG. 4 is a top view of the embodiment shown in FIG. 3.

To economically manufacture the device by blow-molding, the present invention further includes a central base portion 50 as shown in FIGS. 3 and 4. Central base 50 includes legs, internal cavity 12 and fill hole 20. Base 50 also includes opposingly located interior walls 52 and 54 and apertures 55–60 which extend through base 50.

Opposingly located side panels 62 and 64 are connected to base 50 by hinges 66 and 68 which may be molded into the device. Panels 62 and 64 include channels 70–75 which are molded in-between internal faces 80 and 82 and exterior faces 86 and 88. Channels 70–75 are positioned to align with apertures 55–60 to form apertures 14–19. Panels 62 and 64 also include interior walls 80 and 82.

To fully assemble the device, panels 62 and 64 are urged upwardly until interior walls 52 and 54 engage interior walls or faces 80 and 82. Panels 62 and 64 may be permanently affixed to central base 50 by sonic or heat welding, adhesives, and in other ways known to those of skill in the art.

Figure 2:
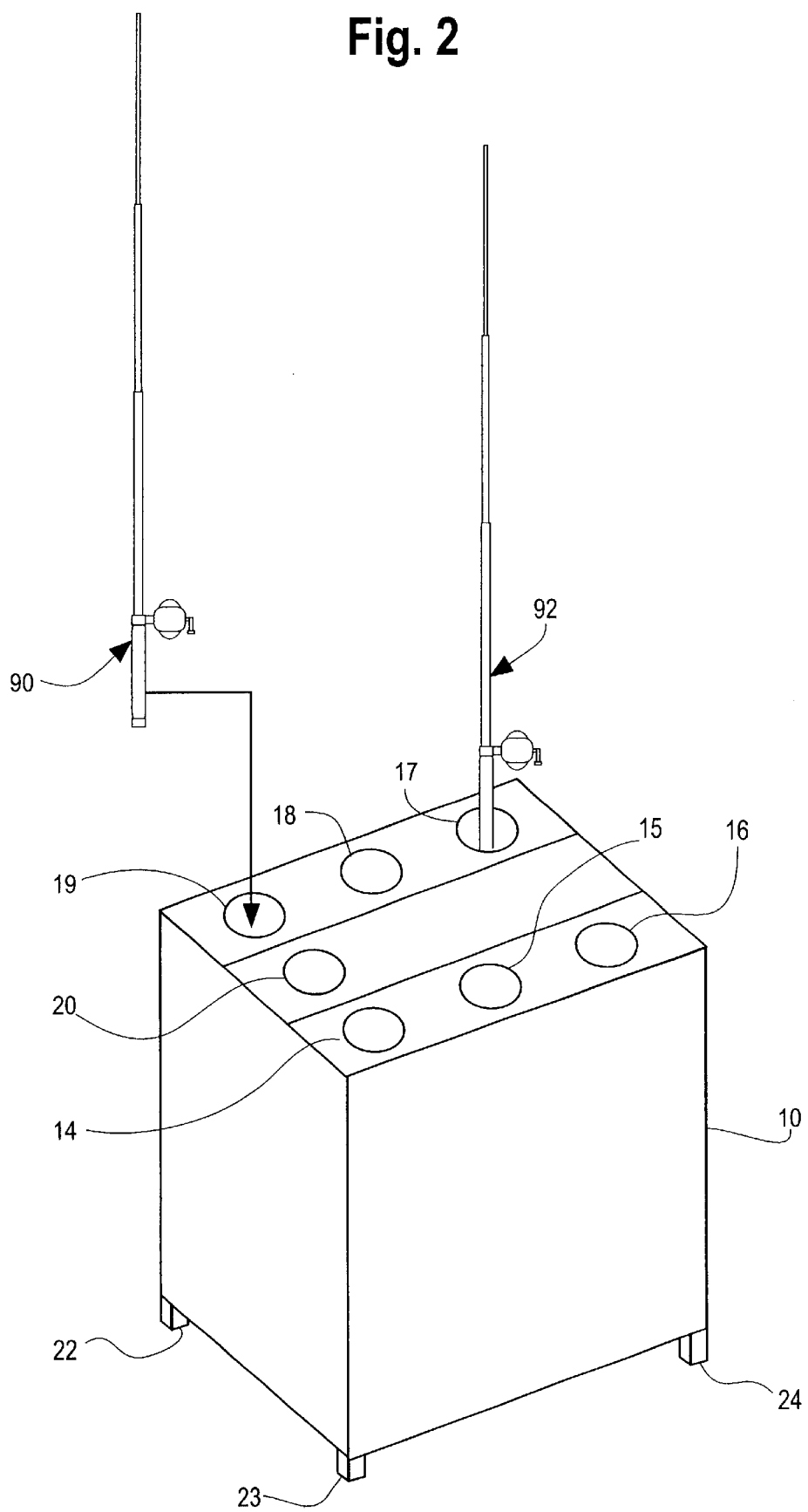
FIG. 2 is a perspective view showing how the present invention secures fishing rods in an upright position.

In use, as shown in FIG. 2, fishing rods 90 and 92 are placed into apertures 14–19. Weight may be added to base 10 by filling internal cavity 12 with water, sand or some other suitable substance through fill hole 20.

As shown, poles are releasably secured in an upright position for storage and cleaning. When washing poles, water will not collect in apertures 14–19 since they extend completely through base 10. In addition, the legs hold base 10 above the support surface so as not to interfere with water drainage.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A fishing rod holder comprising:

a central base having opposingly located sidewalls;

a fill hole in communication with an internal cavity located on said base;

said cavity sized to receive a weight adding material;

a plurality of apertures located on said base;

opposingly located side panels having interior and exterior faces connected to said base by hinges;

a plurality of channels located on said panels formed in-between said interior faces and said exterior faces; and said channels align with said apertures of said base when said interior faces of said panels are adjacently located with respect to said sidewalls of said base to form continuous apertures which are sized to releasably retain fishing rods in an upright position.

2. The holder of claim 1 wherein said base further includes a plurality of legs for supporting said base.

3. The holder of claim 1 wherein said interior faces and said sidewalls are permanently affixed together.

* * * * *